United States Patent [19]
Dumont et al.

[11] Patent Number: 6,021,918
[45] Date of Patent: Feb. 8, 2000

[54] PROGRAMMABLE DISPENSER FOR MEDICATION

[75] Inventors: Richard R. Dumont; Joseph W. Jarosz, both of Wallingford, Conn.

[73] Assignee: Medical Equipment Development Services, Wallingford, Conn.

[21] Appl. No.: 09/208,380

[22] Filed: Dec. 11, 1998

[51] Int. Cl.[7] .............................. G07F 11/00; B65G 59/00
[52] U.S. Cl. .................................. 221/2; 221/9; 221/15; 221/82; 221/132; 221/155; 221/252
[58] Field of Search .............................. 221/3, 9, 12, 15, 221/82, 83, 155, 281, 252, 120, 132, 2

[56] References Cited

U.S. PATENT DOCUMENTS

| | | |
|---|---|---|
| 3,926,335 | 12/1975 | Dangles et al. ............................ 221/82 |
| 4,572,403 | 2/1986 | Benaroya . |
| 4,674,651 | 6/1987 | Scidmore et al. . |
| 4,838,453 | 6/1989 | Luckstead . |
| 5,004,966 | 4/1991 | Eakin ..................................... 221/15 X |
| 5,176,285 | 1/1993 | Shaw . |
| 5,246,136 | 9/1993 | Loidl . |
| 5,323,929 | 6/1994 | Marlar . |
| 5,472,113 | 12/1995 | Shaw . |
| 5,564,593 | 10/1996 | East, Sr. ...................................... 221/3 |
| 5,582,323 | 12/1996 | Kurtenbach . |
| 5,609,268 | 3/1997 | Shaw . |

*Primary Examiner*—Chrisopher P. Ellis
*Assistant Examiner*—Gene O. Crawford
*Attorney, Agent, or Firm*—Dallett Hoopes

[57] ABSTRACT

A central motor-driven disk is formed with a row of open-bottomed pill-receiving virtually contiguous tubes about its border. The disk is surrounded by a first and second ring also having rows of pill-receiving open-bottomed tubes, the tubes come in to registry one-by-one with dispensing openings in a housing which supports these elements. Pills drop through a dispensing opening into a delivery drawer in the housing. Tab portions on the disk and the rings effect the driving by the disk of the first ring and then also the second ring as the pills in the previous ring or disk are dispensed.

23 Claims, 10 Drawing Sheets

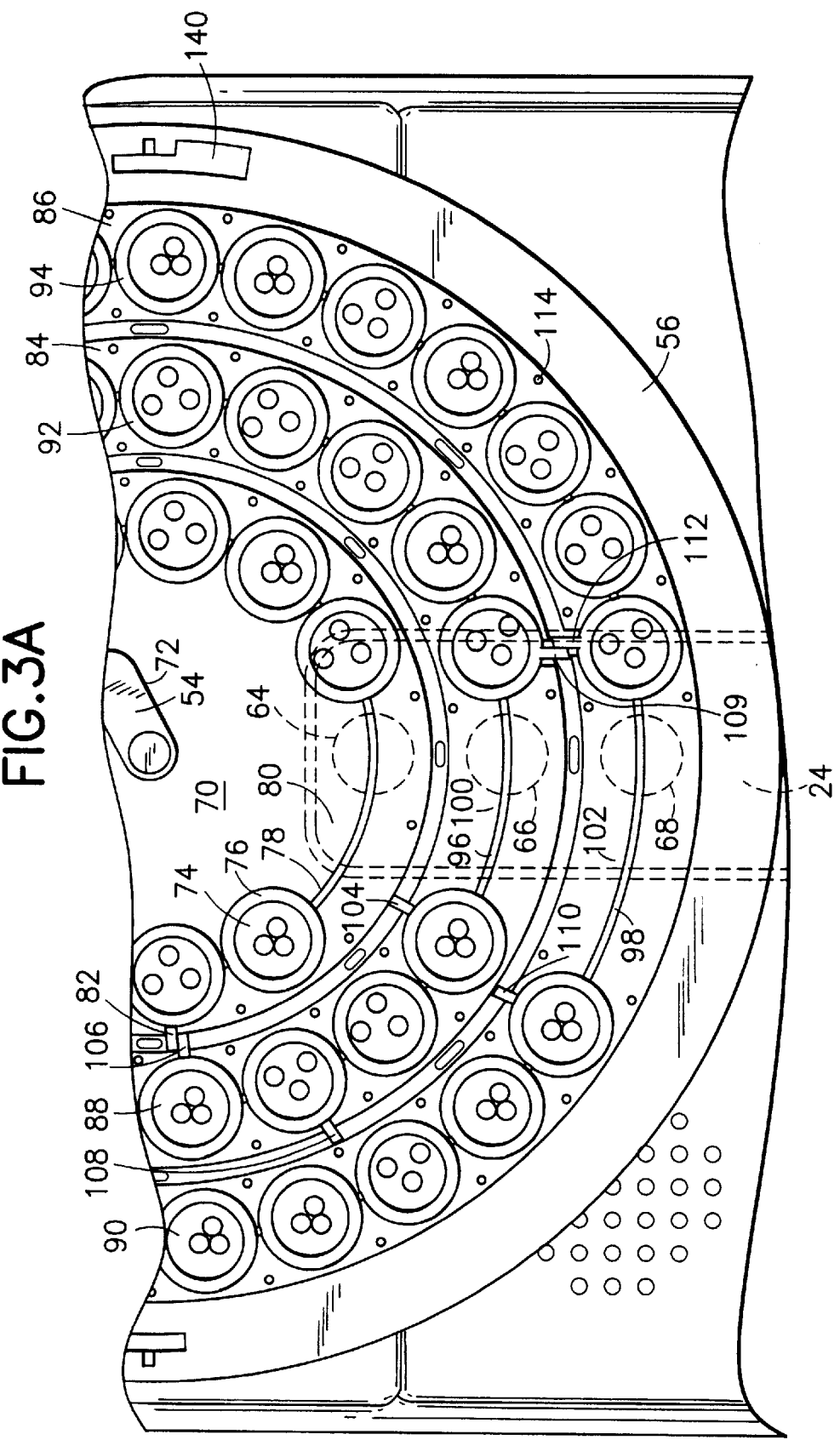

PROGRAMMABLE DISPENSER FOR MEDICATION

FIELD OF THE INVENTION

This invention relates to an especially compact programmable dispenser for medication—tablets and capsules, for instance. More specifically, this invention is a dispenser in which the delivery of medication will be made in dosages and at times preset by the patient or caregiver. It is particularly suited for home or assisted-living situations for patients unable to remember to take their medication on time or unable to remember or to cope with dosage patterns for different types of medicine.

BACKGROUND OF THE INVENTION

The prior art is replete with disclosures of pill dispensers adapted to be programmed to deliver pills in the proper combination and at the proper times as are pre-set.

An example is the U.S. Pat. No. 4,838,453, issued Jun. 13, 1998, to Luckstead which discloses a disk having pockets which successively register with an opening in an underplate to permit medicine to fall into a tray. The disk is turned by a motor which is switched off at the proper time by a portion of ferrous material in the periphery of the disk which affects a magnetically-sensitive switch.

U.S. Pat. No. 5,246,136 to Loidl discloses a dispensing device comprising a manually-turned disk having openings for receiving pills. The openings will successively come into alignment with an opening above a drawer.

The Skidmore U.S. Pat. No. 4,674,651 has a disk with compartments about its periphery, the stopping of the disk being effected by means of lever-actuated pins on the disk, the pins adapted to contact a control switch.

Benoroya U.S. Pat. No. 4,572,403 provides a compartmented annular storage tray and a cover with a door which aligns successively with the compartments. The mechanism includes visual and audible alarms.

U.S Pat. No. 5,472,113 to Shaw issued Dec. 5, 1995 provides a "vaned" wheel disposed on a horizontal axis with compartments between the vanes into which pills are inserted. When the disk rotates, the compartments successively align with a bottom opening in a surrounding housing. Means are provided to block over-discharge by shutting the dispenser down.

Despite all the art, there has been a need for a compact dispenser which will accurately dispense the proper dosages at times set by the user or caregiver.

SUMMARY OF THE INVENTION

The invention is, of course, defined in the claims. Briefly, the dispenser comprises a housing containing a motor and a delivery drawer. The motor turns a loaded center disk supported by the deck of the housing. When the disk is empty, the disk, still being turned, turns a loaded first outward ring. When that is empty, it turns a second outward ring. The disk and the first and second outward rings have bottomless and open-topped compartments carrying the pills and arranged in arcs out from the center of the disk. The compartments align successively with delivery apertures in the housing above the delivery drawer. The compartments, which may be in the form of tubes, are virtually contiguous in arcuate lines on each of the disk and rings to give unusual compactness. Dispensing "events" are counted by a microprocessor so that as dispensing advances from the disk to the first ring and then to the second ring, the motor turns the disk the precise arcuate distance to effect proper movement between successive discharging compartments.

Tab portions on the respective disk and first and second rings engage each other to effect the turning described, and after the final event and the pills have been all discharged, the motor will reverse and reset the disk and rings to the starting position, using different tab portions.

The dispenser includes means to set the delivery times for the dispensing events, a timer and various signal means to indicate dispensing including flasher, voice message, and beeper, or vibrator.

BRIEF DESCRIPTION OF THE DRAWINGS

Further objects and features of the invention will be clear to those skilled in the art from a review of the following specification and drawings, all of which present a non-limiting form of the invention. In the drawings:

FIG. 3A is an enlarged fragment of FIG. 3;

DESCRIPTION OF THE PREFERRED EMBODIMENT

Figure 1:
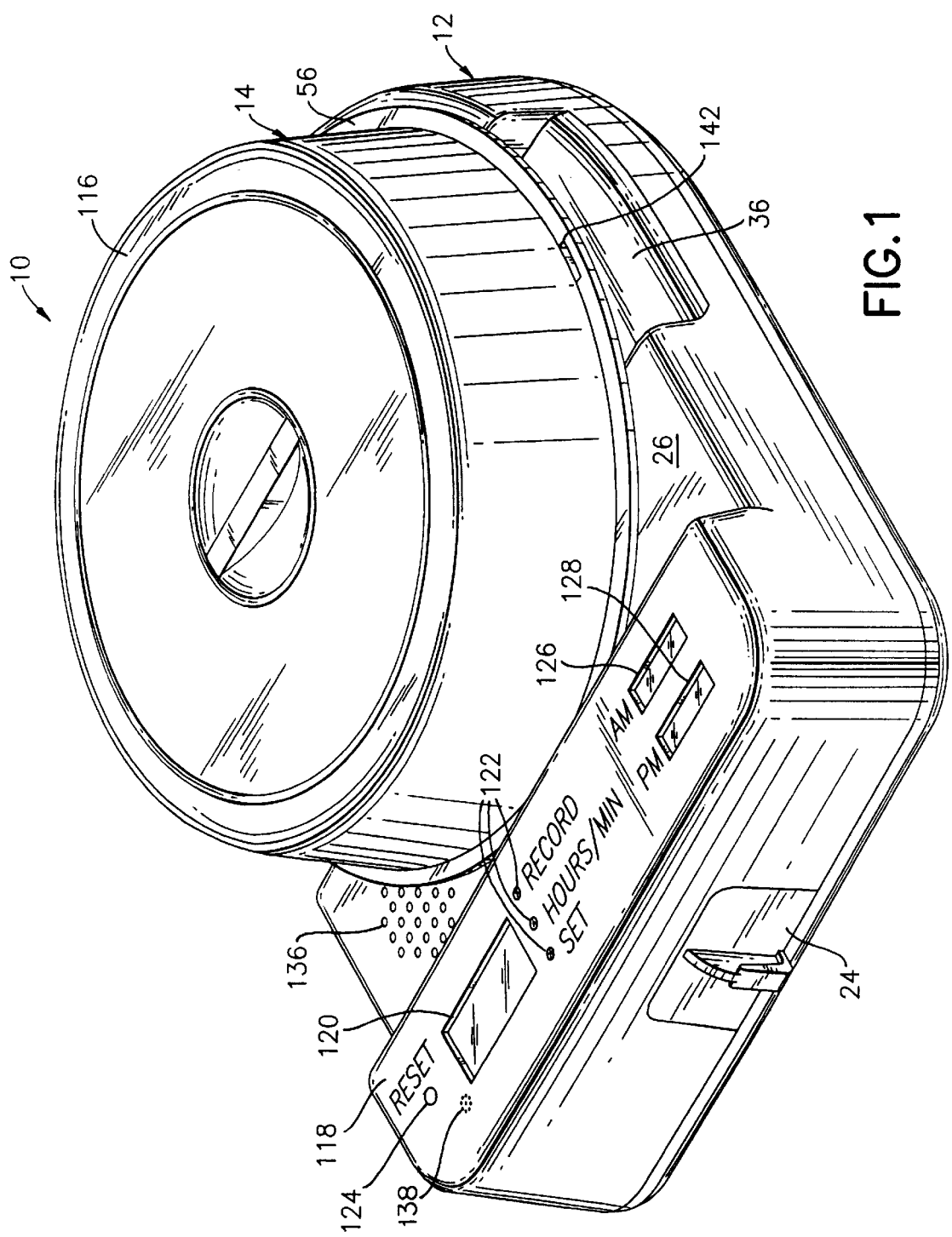
FIG. 1 is a perspective view of a dispenser embodying the invention.

A dispenser embodying the invention is shown in FIG. 1 and generally designated 10. It comprises a hollow housing 12 and a container unit 14.

Figure 7:
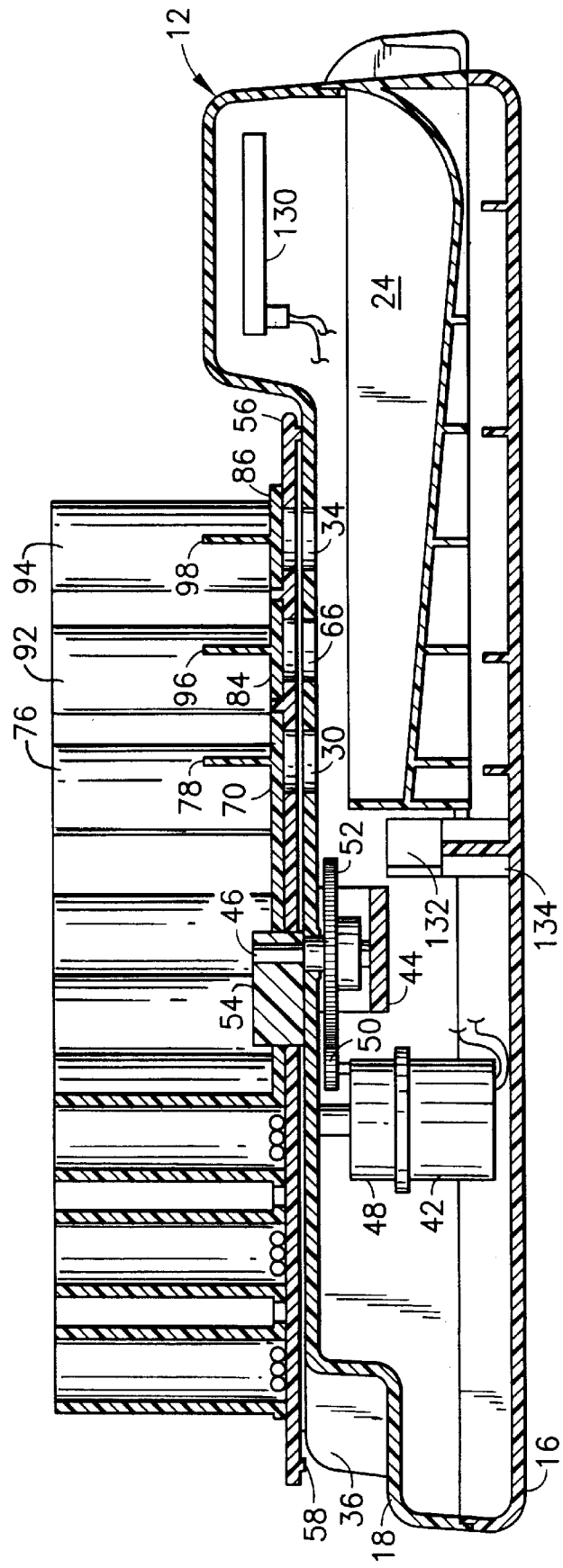
FIG. 7 is a sectional view taken on the line 7—7 of FIG. 3.
Figure 8:
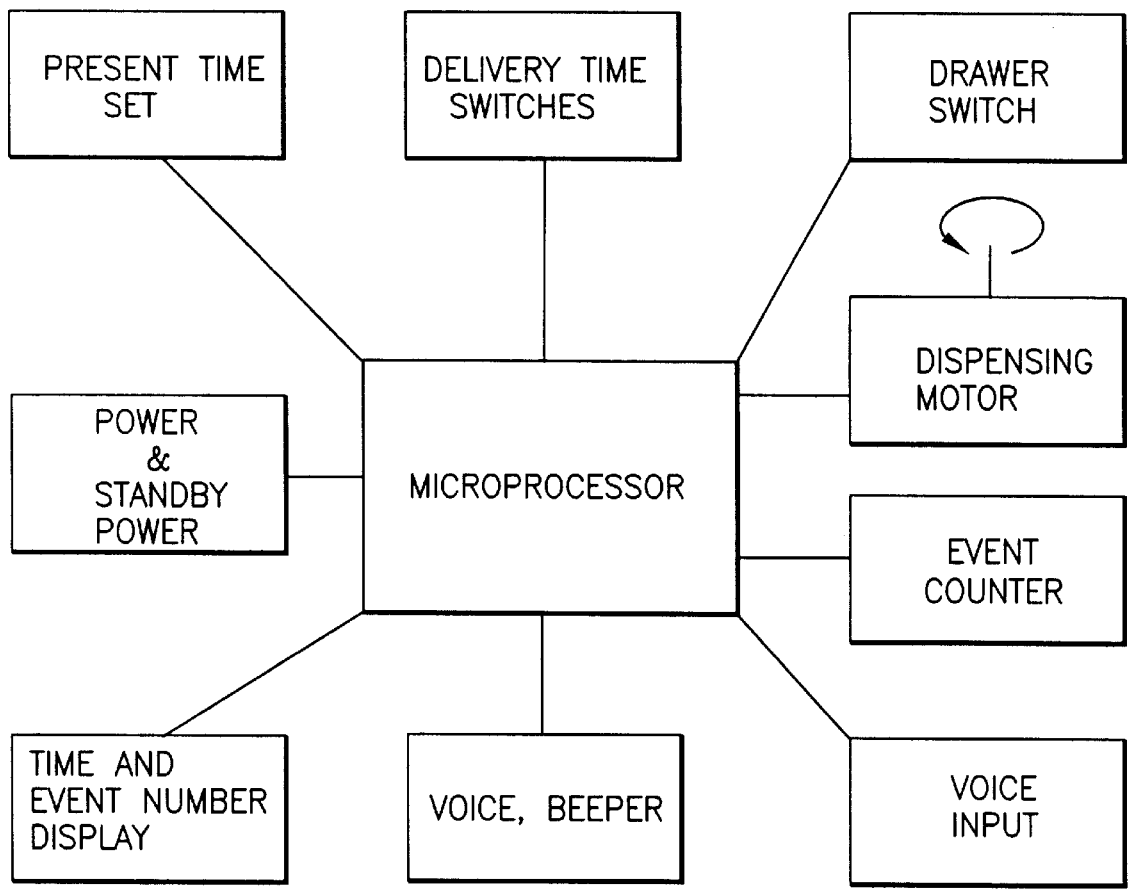
FIG. 8 is a block diagram symbolic of the relationship of the various electrical components of the dispenser.

Referring to FIGS. 1 and 7, the housing 12 comprises a lower part 16 and an upper part 18. The molded housing parts are held in mating position along a seam 20 by fasteners (not shown).

The front of the housing is formed with an opening 22 into which slides a delivery drawer 24.

Figure 2:
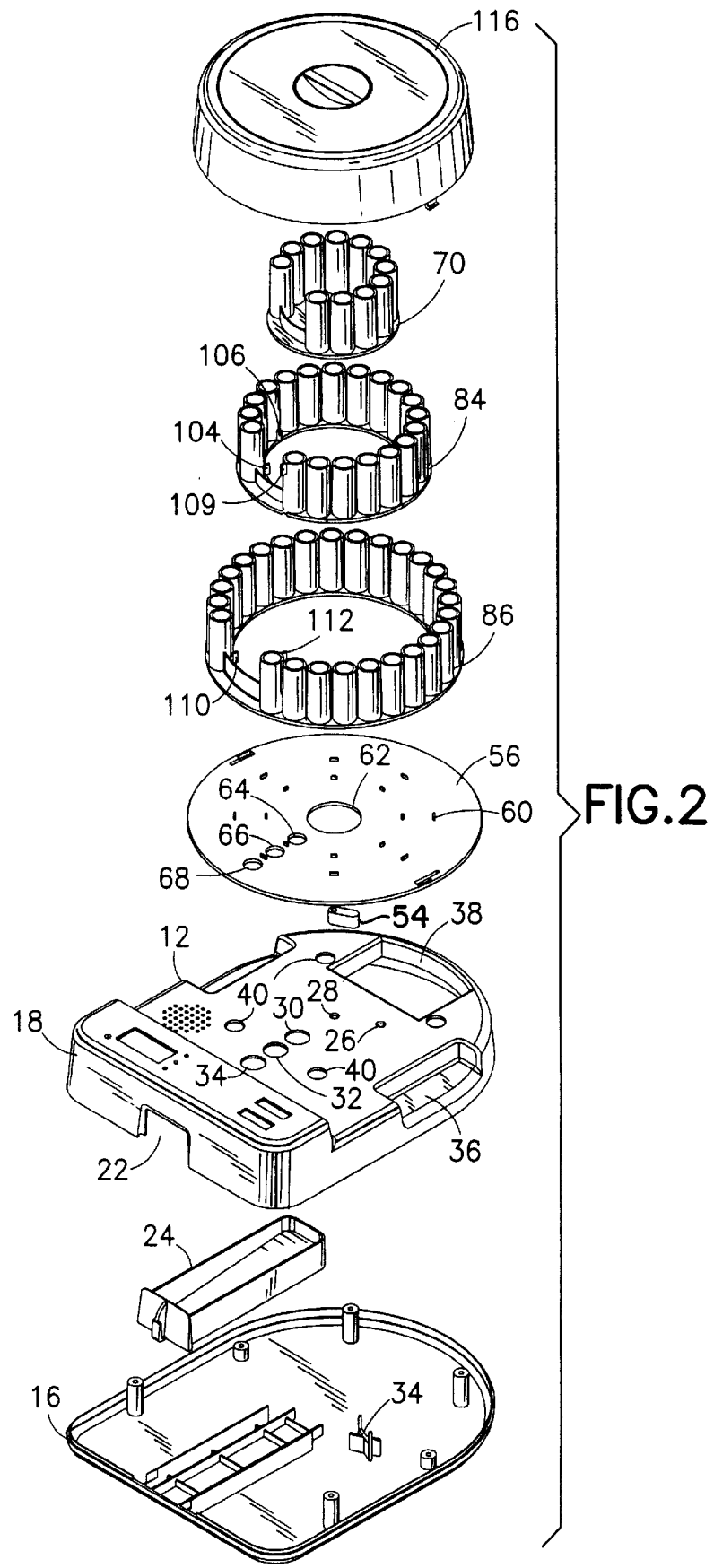
FIG. 2 is a reduced exploded view in perspective of the dispenser.

The deck 26 (FIG. 2) of the housing is formed with a central drive shaft aperture 28, and extending radially outward from aperture 28 are a plurality of delivery apertures 30, 32, 34. On its opposite sides the deck is recessed for a hand access 36. A major cut-out 38 is provided at the rear.

Orienting openings 40 are also formed in the deck generally equidistant from the central drive shaft aperture 28.

Mounted by means (not shown) within the housing is an electric motor 42 (FIG. 7) adjacent a bearing platform 44 which rotatably mounts a drive shaft 46 which passes upwardly through the shaft aperture 28. The motor 42 incorporates a reducing gear box 48 having an output pinion 50 which meshes with a gear 52 on the drive shaft 46. Above the deck 26 the shaft 46 mounts a male coupling part in the form of an oval lateral crank 54.

Seated flat on the deck 26 is the circular base plate 56. The support base may be formed on its underside with orienting dimples (not shown) received into orienting openings 40. The underside of the support plate 56 is formed with spacing nibs 58 to keep the deck and the support plate 56 spaced to accommodate irregularities in the deck, etc. The circular base plate 56 is also formed with upward spaced guide nibs 60 arranged in circular rows concentrically with the center of the circular base plate.

The base plate 56 is also formed with a central cut-out 62 amply receiving the crank 54 and permitting it to swing about. Lined up outward from the cut-out 62 are the dispensing openings 64, 66 and 68 in plate 56 which register with the delivery apertures 30, 32, 34 of the deck. As the tubes, to be described, successively come over the openings and apertures, the medication in each drops through the opening and aperture to the drawer 24. The drawer is opened by the patient and the medicine taken. The drawer is reinserted.

Figure 3:
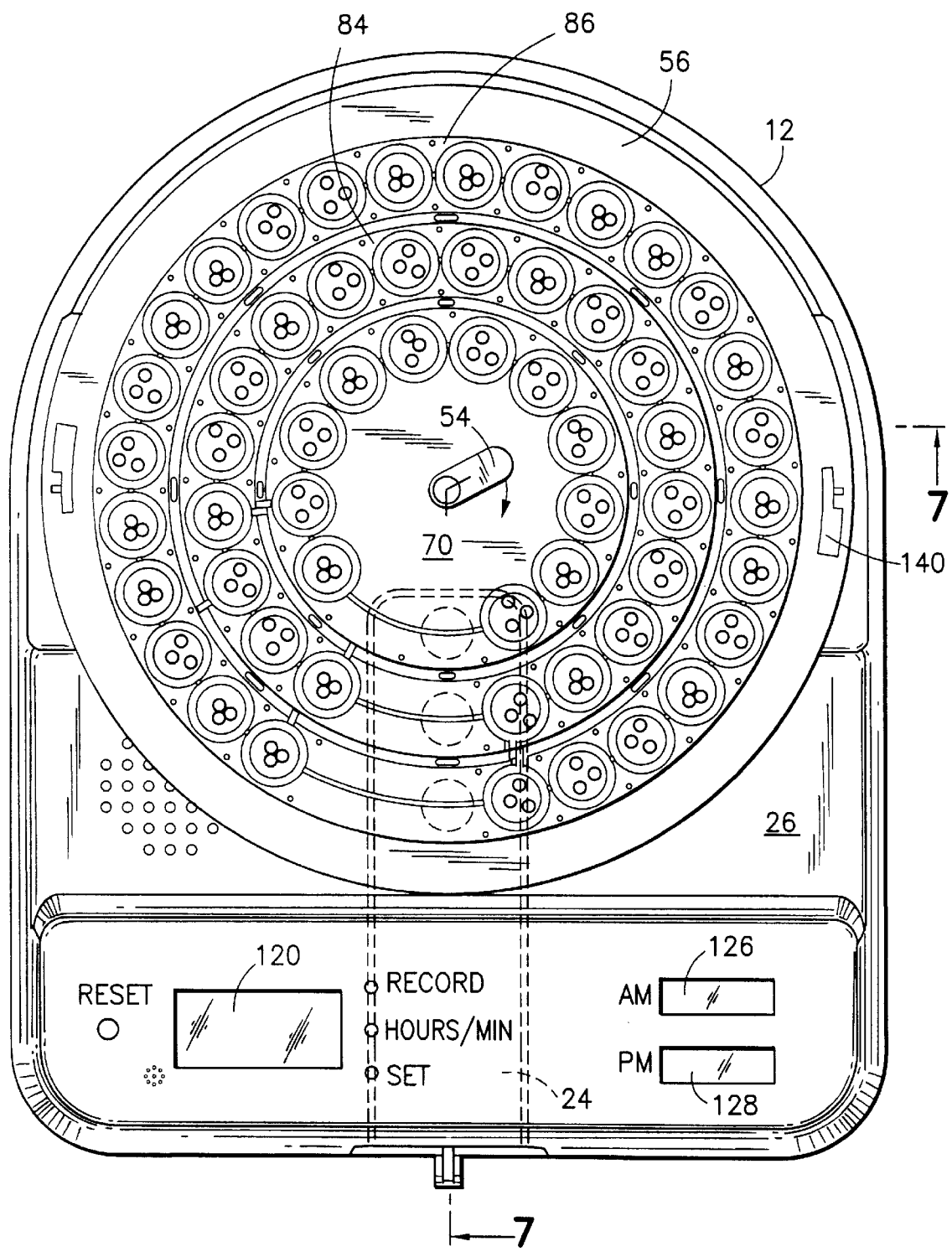
FIG. 3 is an enlarged top view with the cover of the dispenser removed at the commencement at its fully loaded condition and ready for the first dispensing event.
Figure 3B:
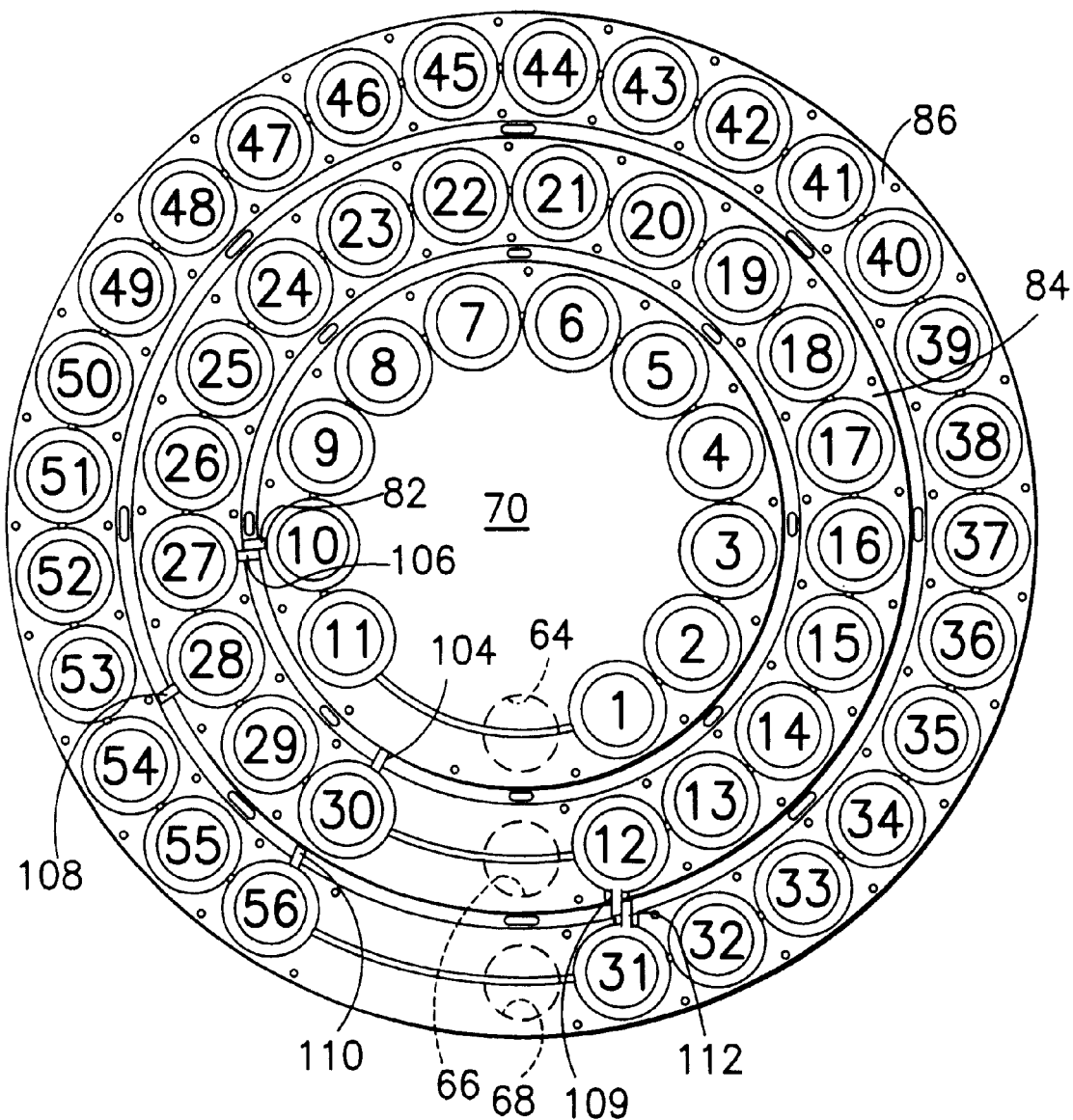
FIG. 3B is a top symbolic view of the disk, rings and tubes to assist in disclosing the mechanical operation of these parts.
Figure 4:
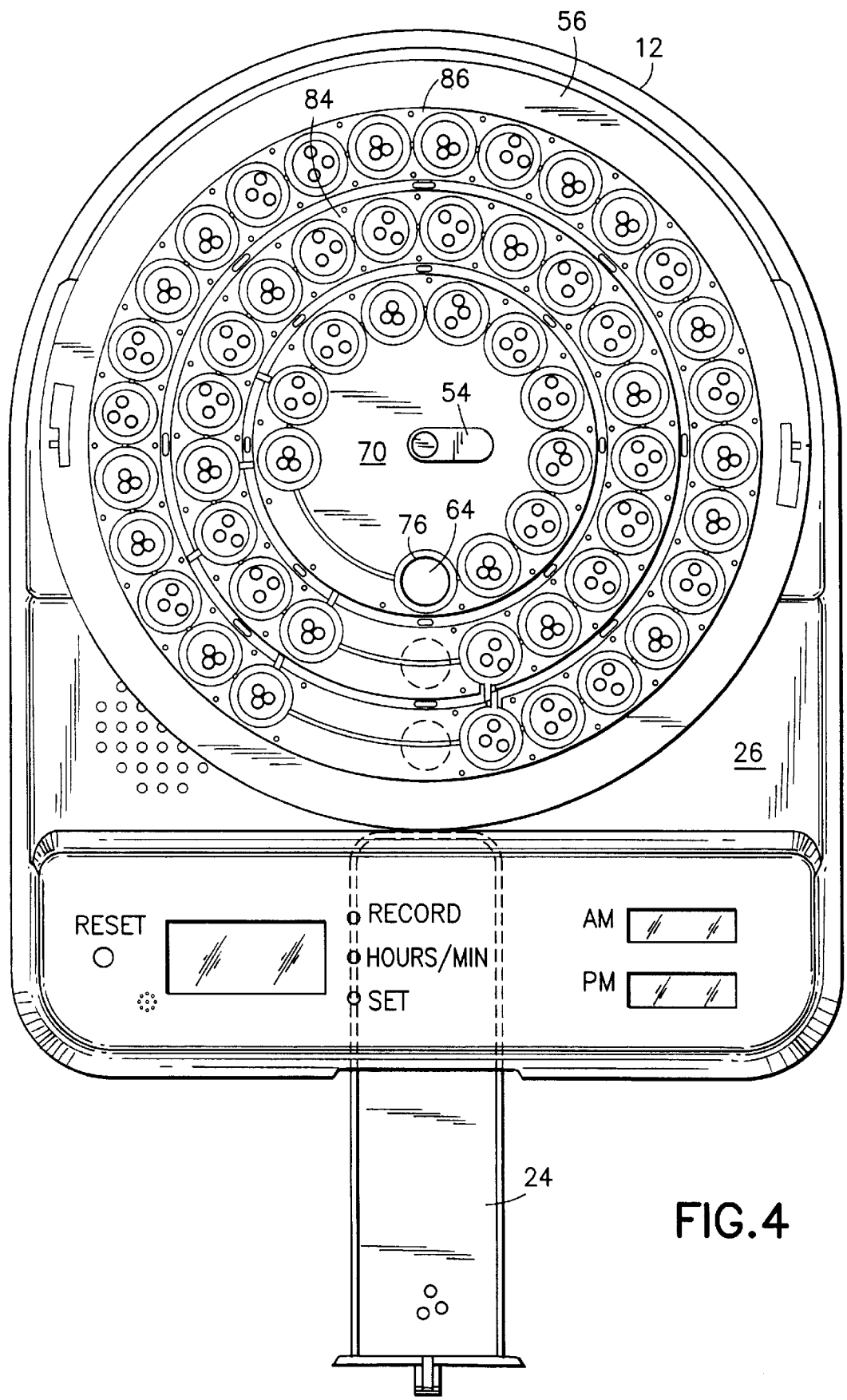
FIG. 4 is similar to FIG. 3 but showing the dispenser on the occasion of the first dispensing event with the drawer open, the dispensed pills appearing in the drawer.
Figure 5:
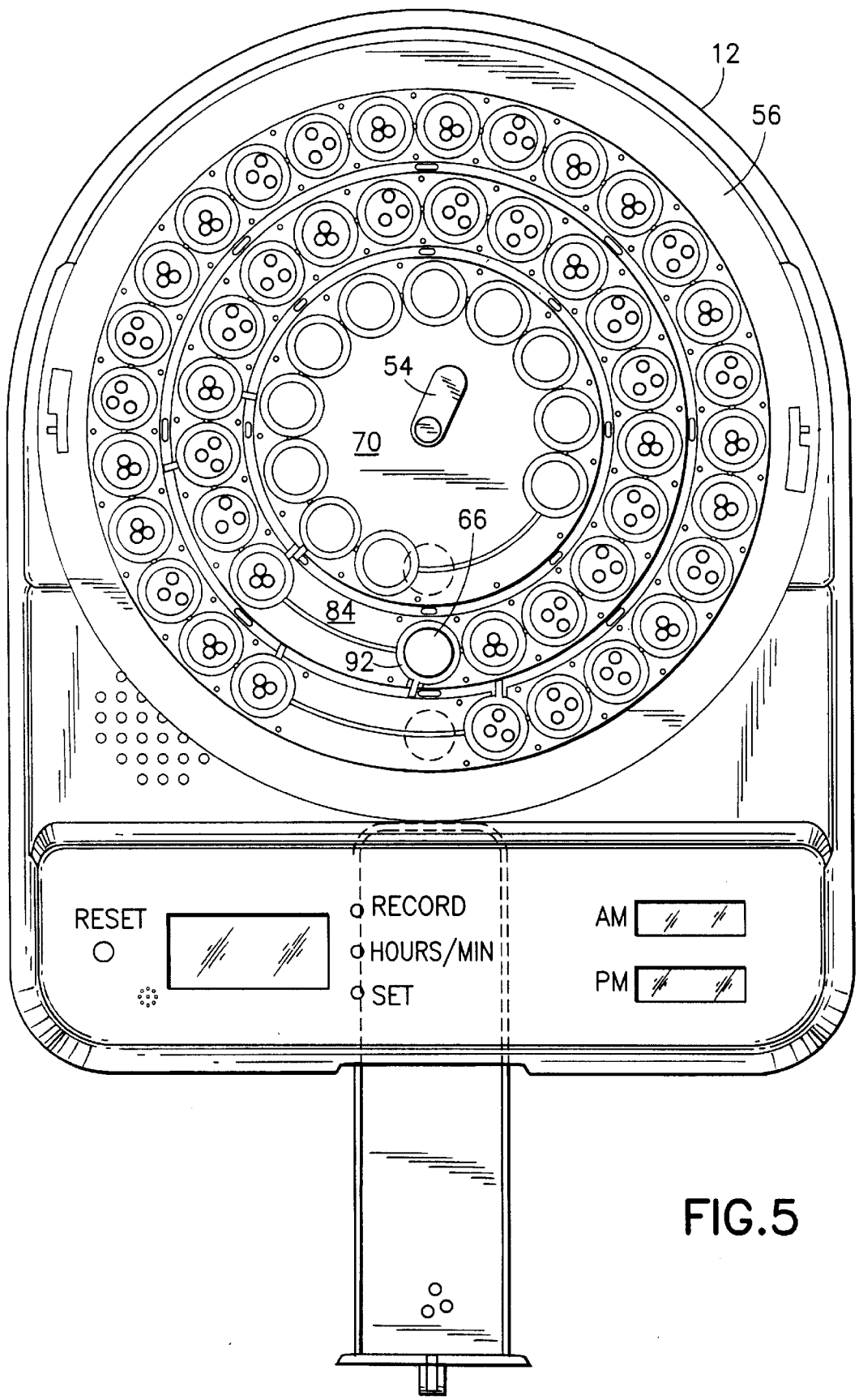
FIG. 5 is similar to FIGS. 3 and 4 but showing the dispenser on the occasion of the 12th dispensing event with the drawer open and the pills shown in the drawer.
Figure 6:
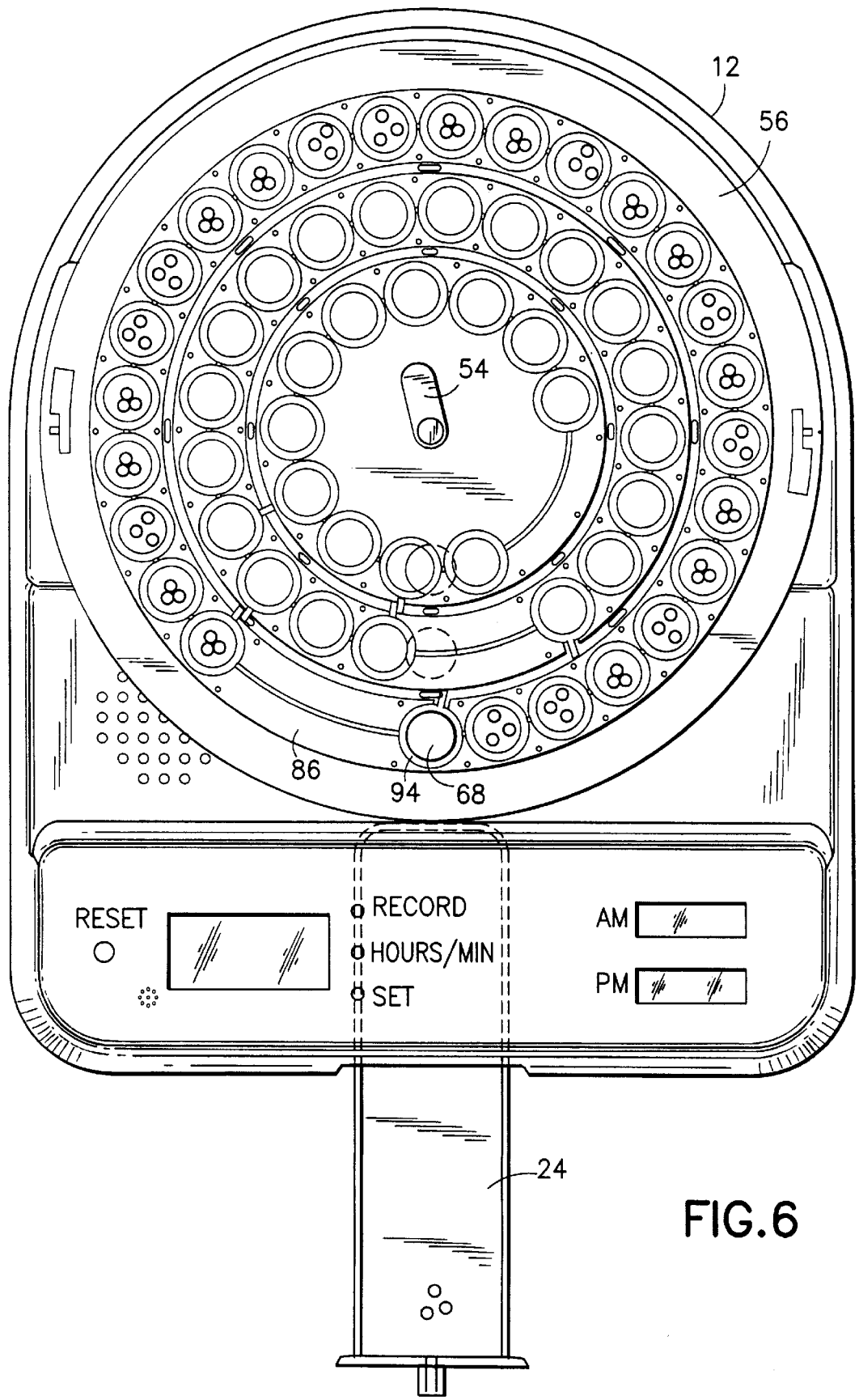
FIG. 6 is similar to FIGS. 3, 4 and 5 but showing the condition of the dispenser on the occasion of the 31st dispensing event.

Seated on the central portion of the base plate (FIG. 3) is the drive disk 70. The disk 70 is a single molded unit having a central oval cut-out 72 which constitutes a female coupling part, snugly receiving the oval crank 54 of the drive shaft 46. The drive disk 70 (FIG. 3A) is formed along its border with a circular array of side-by-side windows 74 from each one of which extends upwardly an open-ended tube 76 constituting a pill-receiving compartment. For compactness the tubes are closely adjacent each other, virtually contiguous, being spaced only by an intermittent strengthening rib 78. The rib 78 also extends across an interrupted portion or null zone 80 in which there are no windows or tubes. Adjacent the disk at the foot of one of the tubes 76 (the second clockwise from the null zone) is formed an outward tab portion 82 (Tube 10 in FIG. 3B).

Outward from the disk 70 (FIG. 3) are a pair of successively larger rings, a first ring 84 and a second ring 86, both concentric with the shaft 46. The rings ride on the base plate 56 centered by the circularly arranged guide nibs 60. The nibs serve to space the rings from each other and the disk 70. The rings 84 and 86 are formed with circularly arranged windows 88 and 90 respectively from which extend upwardly open-ended tubes 92 and 94 respectively. Again, the tubes on the respective rings are virtually contiguous to give the unit a unique compactness. The tubes are separated only by fragments of intermittent stiffening ribs 96 and 98. These ribs extend also across null zones 100 and 102 on the respective rings.

Certain of the tubes 92 on the first ring 84 (FIG. 3A) are formed with inward tab portions 104, 106 at the same level as the tab portion 82 on one of the tubes 76 so as to purposely interfere therewith. Specifically, an inward tab portion 104 is formed at this same level on the first tube measured clockwise from the null zone 100 (Tube 30 in FIG. 3B). Further, an inward tab portion 106 is formed at this same level on the fourth tube measured clockwise from the null zone 100 (Tube 27). An outward tab portion 108 is formed on the third tube (Tube 28) measured clockwise from the null zone. An outward tab portion 109 is formed at a higher level on the first tube measured counter-clockwise (Tube 12).

In the second ring 86, the first tube measured clockwise from the null zone 102 is formed at the lower level with an inward tab portion 110 (tube 56). The first tube measured counter-clockwise from the null zone 100 (Tube 31) is formed with an inward tab portion 112 at the upper level. As shown (FIG. 3A), particularly with respect to the tab portions on the outer or second ring 86 and the outward tab portions on the first ring 84, tab portions may be angled to promote smoother and more accurate operation.

All of the disk 70, first ring 84 and second ring 86 may be formed with downward nibs 114 having anti-friction function as they ride on the support plate 56. A plastic transparent cover 116 (FIG. 1) sits over the disk 70 and rings 84, 86 and their tubes and rests on the support plate 56.

Forward of the deck 26 the housing is formed with an upward pedestal 118. The pedestal 118 of the hollow housing 12 permits mounting space for the various electric and electronic components having to do with timing, control, and signaling a dispensing event. More specifically, the top of the pedestal is formed with a liquid crystal display rectangle panel 120 which, during operation, alternately flashes the present time and the number of the active tube and the dispensing event in the full dispensing sequence.

Tiny openings 122 are provided above switches (not shown) to program a voice recording, set and the present time reading. A tiny opening 124 is provided to reset the clock if desired or necessary and to reset the dispensing sequence. Also in the top wall of the pedestal 118 are banks 126 and 128 of slide switches (represented by rectangles in FIG. 1 and other FIGS.), a dozen in each bank to set the hour of the day at which a dispensing "event" is to occur.

In the underside of the pedestal (FIG. 7) is housed, shown only schematically, a microprocessor 130 which controls the operation of the motor, responds to the setting of the clock, the resetting, and initiates the motor 42 at each event to advance the disk and rings the precise distance necessary to effect an event.

Suitable as the microprocessor is a product designated PIC-16C923 available from Microchip Corp. of Chandler, Ariz.

Also present in the housing is the drawer microswitch 132 and microswitch support 134.

On the occasion of an event, the panel 120 will immediately flash alternately the number of the event (which is the tube number in FIG. 3B) in the sequence as 1 through 56 (See FIG. 3B), and the present time. In addition, there will be a voice message from the speaker 136 which will have been recorded by the patient or caregiver by speaking through the microphone 138 while the voice switch is depressed through the aperture 122. Additionally, a radio signal receivable within 50 feet of the dispenser to the patient's beeper will emanate from the dispenser.

The support plate 56 carries fittings 140 which are diametrically opposite. Mating fittings 142 (FIG. 1) are formed in the underside of the transparent cover 116 so that, when the cover is in place and turned clockwise, the cover, the disk and rings and the base plate all become a closed container 14 which may be removed as a package from the housing 12 by lifting, facilitated by the hand access openings 36. Thus, a stand-by charged container may be available for ready substitution onto the housing 12 in place of an empty one.

The operation of the dispenser may be described as follows:

For simplicity in the designation of operation, the circular rows of tubes are referred to as "wheels". Thus, the "inner wheel" is the row of tubes 76 on the disk; the "middle wheel" is the row of tubes 92 on the first ring; and the "outer wheel" is the row of tubes 94 on the second ring.

Description of Operation as Described to a User

A. Loading and Dispensing: each tube in the three wheels corresponds to a time of day that the medication is to be dispensed. The correct dosage of medication must be loaded into each tube using the following loading procedure:
1. The three dispensing wheels are in the starting position with the initial tubes 1, 12 and 31 (FIG. 3B) aligned rightward of the dispensing openings 64, 66, 68.
2. The inner wheel is first loaded starting at tube 1 and working in a counter-clockwise direction. When all eleven tubes are filled, the middle wheel is loaded, starting loading at tube 12, working in a counter-clockwise direction until all nineteen tubes are filled. The outside wheel is loaded last, starting at tube 31, working in a counter-clockwise direction until all twenty-six tubes on the outer wheel are filled.
3. The am/pm slide switches 126, 128 are set to correspond to the time of day the medication is to be dispensed.
4. The clock 122 is set to the current time of day.
5. The device will start dispensing the next day (after 12:00 a.m.) at the first user-programmed time. This is so that a nurse or guardian can load the device and tell the user that the dispenser will start the following morning. A one-day cycle is considered to be from 12:00 a.m. to 11:59 p.m.
6. The dispenser will now dispense at the user-programmed times until all fifty-six tubes are emptied. The microprocessor, having a component which has counted the events, will automatically rewind the wheels back to the load position and the display 120 flashes, notifying the user the machine is empty. The display flashes "00". More specifically, regarding the drive, referring to FIG. 3B, the inner (drive) wheel or disk 70 begins dispensing its tubes 1–11 in a clockwise direction. When tube #12 center wheel (ring 84) is due to dispense, the inner (drive) wheel 70 turns, causing tube #10 (low tab portion 82) to push center wheel tube #30 (low tab portion 104). The inner (drive) wheel is now positioned to turn the center wheel, dispensing tubes 12–30. When tube #31 is due to dispense, inner (drive) wheel 84 turns, causing center wheel tube #28 (low tab portion 108) to push outer wheel (ring 86) tube #56 (low tab portion 110). The inner (drive) wheel is now positioned to turn the center and outer wheels, dispensing outer wheel tubes 31–56.

For each "event" the active wheel being driven advances a uniform annular distance, irrespective of which wheel is the active dispensing wheel at the time. This is achieved by the power and timing means being programmed to stop the wheel so that for each successive active dispensing wheel, the motor 42 rotates precisely the number of turns to advance the active wheel, considering its radius from the axis of the drive wheel, the advance distance measured annularly between two adjacent tubes. The microprocessor controls the motor. As its component counts the events, it will reduce the number of turns of the motor 42 depending on the radius of the active wheel.

After outer wheel tube #56 has dispensed and the drawer 24 is removed and reinserted, the inner (drive) wheel will automatically start rewinding in a counterclockwise direction. As it rewinds, center (drive) wheel tube #10 (low tab portion 82) pushes center wheel tube #27 (low tab portion 106), allowing the inner wheel to be rewound. The inner (drive) wheel will continue to rewind until center wheel tube #12 (high tab portion 109) pushes outer wheel tube #31 (high tab portion 112), causing it also to rewind. The inner (drive) wheel will continue its rewind cycle until all three wheels have returned to the start point (FIG. 3B).
7. The device is then ready for reloading.

B. Signaling means to alert the patient that it is time to take the delivered medication immediately or within one hour.
1. The alarms are activated by the user-programmed slide switches 126, 128.
2. When the active wheel moves in to position to deliver pills from the next tube, three alarms will trigger simultaneously:
   a. The display 120 will flash the event or tube number (FIG. 3B) continually for one hour or until the drawer 24 is removed and reinserted into the dispenser housing 12. This tube number will give the user an idea as to when the dispenser is nearing empty.
   b. The voice alarm from speaker 136 will sound for one minute continually and then once every five minutes until the drawer is removed and reinserted into the dispenser housing. The voice alarm will silence after one hour.
   c. The rf pager will alarm for one hour or until the drawer 24 is removed and reinserted into the dispenser housing.

C. In the event the medication is not removed from the dispenser (the drawer 24 is not opened and reinserted), the wheel drive is locked out for one twenty-four-hour period, shutting down the dispenser until the following day at the correct time. At that time, the three alarms will trigger again.

The power for the dispenser is normally supplied externally from a step-down transformer situated at wall plug communicating its 15 volt output to the dispenser through a power line. However, a 12 volt, 1.2 amp battery, which may be inserted into the housing through the cut-out 38, may be a fallback should the power fail.

Given the disclosure of the structure and operation of the dispenser herein, one skilled in the art will be easily able to infer the circuitry not disclosed. This should enable him, without experimenting, to practice the best mode of carrying out the invention as claimed herein.

A dispenser has herein been disclosed which combines compactness and reliability. The compactness is attributable to the close, uniform spacing of the tubes and the reliability partly stems from the activating of the wheels one-by-one so that only one active wheel operates over the dispensing openings at a time. This ensures against double delivery into the drawer. The uniform advancing of the uniformly spaced tubes into dispensing position is made possible—irrespective of the distance the tube is from the center of the dispenser—by the control means including the microprocessor which keeps track of the number of the active tube and activates the motor for the proper number of rotations needed to make the uniform advance at the distance of that tube from the center.

Variations of the design described are contemplated. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A dispenser for pills comprising:
   a. a housing having a deck formed with a central drive opening and a line of delivery apertures outward from the drive opening,
   b. a motor in the housing driving an upward drive shaft accessible through the opening in the deck,
   c. a drive disk supported by the deck and operatively connected to the drive shaft for rotation, the disc having a circular line of open-bottomed pill compartments inward from a peripheral margin thereof, the pills dropping as the compartments on the disk successively come over a more-inward delivery aperture,
   d. a ring supported by the deck and surrounding the disk and also having a circular line of open-bottomed pill compartments therealong, the pills dropping as the compartments on the ring successively come over a more-outward delivery aperture,
   e. tab portions on the disk and ring arranged so that, after pills have dropped from compartments on the disk, the tab portions will engage so that continued rotation of the disk by the motor will rotate the ring.

2. A dispenser as claimed in claim 1 wherein the compartments are vertical tubes having open upper ends.

3. A dispenser as claimed in claim 1 wherein the compartments in each circular line are closely and uniformly spaced and a micro-processor activates the motor to move the disk or the ring sufficiently to bring the next compartment over the respective delivery aperture irrespective of the distance from the drive shaft to the said next compartment.

4. A dispenser as claimed in claim 3 wherein a second ring is supported by the deck and surrounds the first ring and also is formed with a circle of closely and uniformly spaced pill compartments, the pills dropping as the compartments on the second ring successively come over a still-more-outward delivery aperture, and a second set of tab portions are formed in the first and second rings arranged so that, after pills have dropped from the compartments on the first ring, the second set of tab portions will engage so that continued rotation of the disk and ring will rotate the second ring.

5. A dispenser as claimed in claim 4 wherein a third set of tab portions is formed on the disk and first and second rings so that, upon reverse rotation by the motor, the disk and first and second rings can be reset to their original positions.

6. A dispenser for medical capsules and tablets comprising:
   a. a housing having a top wall formed with a drive opening and delivery apertures outward from the drive opening,
   b. rotary drive means in the housing terminating in an upwardly directed coupling portion accessible through the drive opening,
   c. a dispensing drawer in a side of the housing, the drawer disposed under the delivery apertures,
   d. a base plate disposed on the top wall and formed with dispensing openings aligned with the delivery apertures in the top wall, and an opening for the coupling portion,
   e. a disk over the drive opening and a plurality of flat rings of progressively larger diameter arranged concentrically on the base plate surrounding the disk, the disk and rings each formed with an arcuate line of windows; the lines being centered about the center of the disk, and open-ended tubes extending upward from the disk and rings over the respective windows, the disk having a central coupling portion adapted to operatively engage the coupling portion in the housing, the disk having an outward tab portion adapted in rotation in one direction to eventually engage and turn the next outward ring in said direction and the next outward ring having an outward tab portion adapted to eventually engage and turn the further next outward ring in said direction,
   f. timing and power means for periodically energizing the drive means to step around the disk so that successive windows on the disk and rings come into registry one at a time with the delivery apertures so that any pills or capsules in the tube fall into the drawer.

7. A dispenser as claimed in claim 6 wherein the timing and power means comprises shut-off means for the dispenser if the drawer is not opened before a preset maximum period after the dispensing of the pills or capsules into the drawer.

8. A dispenser as claimed in claim 6 wherein the base plate is formed with upward nibs to guide the disk and rings in their rotation.

9. A dispenser as claimed in claim 6 wherein each window on each of the disk and the rings are closely and uniformly spaced apart the same distance from its neighbors on the same disk or rings, the spacing being measured along the circle along which the windows are arrayed.

10. A dispenser as claimed in claim 6 wherein the windows have substantially the same width as the dispensing openings.

11. A dispenser as claimed in claim 10 wherein the timing and power means advances the disk or rings from which said pills or capsules are being dispensed an arcuate distance equal to the distance between centers of adjacent windows.

12. A dispenser as claimed in claim 6 including additionally a cover for the disk, rings and tubes, the cover adapted to fit over the disk, rings and tubes and rest on the base plate.

13. A dispenser as claimed in claim 12 wherein the cover is transparent.

14. A dispenser as claimed in claim 12 including retaining means on the cover and the base plate for holding the cover and base plate together for removal from the housing.

15. A dispenser as claimed in claim 14 wherein the housing is formed with hand-receiving recesses under the base plate to assist in the removal.

16. A dispenser as claimed in claim 14 wherein the retaining means is in the form of mating bayonet-type fittings on the cover and base plate.

17. A dispenser for pills comprising a housing including an electric motor, and a disk and at least one ring surrounding the disk and the disk being operatively connected to the motor, the disk and the ring being provided with uniformly arcuate-spaced windows and open-topped compartments upward from the windows respectively, a base plate fixed on the housing and having a dispensing opening having the same width as the windows, the windows successively registering with the dispensing opening, the disk and ring each having outward tab portions adapted to engage and turn the ring when the disk has discharged its pills.

18. A dispenser as claimed in claim 17 wherein the windows on the disk and ring are interrupted to form a non-discharging portion for that disk or ring when the interruption is over the dispensing opening.

19. A dispenser as claimed in claim 18 wherein a starting condition for the dispenser is where the non-discharging portions for the disk and rings are radially aligned from the center of the disk.

20. A dispenser for medical capsules and pills comprising:
   a. a box-like housing having a top wall formed with a drive opening and delivery apertures outward from the drive opening, b. drive means in the housing terminating in an upwardly directed coupling accessible through the drive opening, c. a dispensing drawer in a side of the housing, the drawer disposed under the delivery apertures, d. a disk centrally connected to the coupling and plurality of flat rings of progressively larger diameter arranged concentrically outward of the disk and supported by the top wall, the disk and rings formed with concentric circular rows of windows, and open-ended compartments extending upward from the disk and rings over the respective windows, the disk having a tab portion adapted in rotation to engage and turn the ring, e. timing and power means for periodically energizing the drive means to step around the disk so that successive windows on the disk and rings come into registry one at a time with the apertures so that any pills or capsules in the compartment above the delivery aperture fall into the drawer.

21. A dispenser as claimed in claim 20 wherein the timing and power means comprises shut-off means for the dispenser if the drawer is not opened before a preset maximum time period after the dispensing of the pills or capsules into the drawer.

22. A dispenser as claimed in claim 20 including additionally a cover for the disk, rings and compartments.

23. A dispenser as claimed in claim 22 wherein the cover is transparent.

* * * * *